(12) United States Patent
Kubo et al.

(10) Patent No.: US 8,474,792 B2
(45) Date of Patent: Jul. 2, 2013

(54) VALVE DEVICE AND MANUALLY OPERATED SHUTOFF VALVE DEVICE

(75) Inventors: Toshikatsu Kubo, Okazaki (JP); Toshihiko Shima, Okazaki (JP); Takuya Suzuki, Anjo (JP); Munetoshi Kuroyanagi, Aichi-ken (JP)

(73) Assignee: JTEKT Corporation, Osaka-shi (JP)

( * ) Notice: Subject to any disclaimer, the term of this patent is extended or adjusted under 35 U.S.C. 154(b) by 699 days.

(21) Appl. No.: 12/235,077

(22) Filed: Sep. 22, 2008

(65) Prior Publication Data

US 2009/0108225 A1 Apr. 30, 2009

(30) Foreign Application Priority Data

Sep. 25, 2007 (JP) ................................. 2007-247615

(51) Int. Cl.
- *F16K 1/42* (2006.01)
- *F16K 1/02* (2006.01)
- *F16K 1/30* (2006.01)
- *F16K 31/50* (2006.01)

(52) U.S. Cl.
USPC ........... 251/359; 251/266; 251/278; 251/322; 251/323

(58) Field of Classification Search
USPC ................. 251/175, 322, 323, 332, 266, 359, 251/334, 378, 172, 278
See application file for complete search history.

(56) References Cited

U.S. PATENT DOCUMENTS

| | | | | |
|---|---|---|---|---|
| 2,895,497 A | * | 7/1959 | Jones | 137/316 |
| 2,963,267 A | | 12/1960 | Bancroft | |
| 3,081,062 A | * | 3/1963 | Dumm | 251/175 |
| 4,172,585 A | * | 10/1979 | Rolfe | 251/357 |
| 4,682,759 A | * | 7/1987 | Hall et al. | 251/210 |
| 5,452,738 A | * | 9/1995 | Borland et al. | 137/265 |
| 5,474,104 A | * | 12/1995 | Borland et al. | 137/381 |
| 5,869,746 A | * | 2/1999 | Watanabe et al. | 73/49.7 |
| 6,152,180 A | * | 11/2000 | Yang | 137/801 |
| 6,196,523 B1 | * | 3/2001 | Miyata et al. | 251/276 |
| 6,314,986 B1 | * | 11/2001 | Zheng et al. | 137/240 |
| 6,957,661 B1 | * | 10/2005 | Borton et al. | 137/550 |
| 8,052,119 B2 | * | 11/2011 | Numazaki et al. | 251/357 |
| 2006/0137744 A1 | * | 6/2006 | Anastas | 137/487.5 |

FOREIGN PATENT DOCUMENTS

| | | |
|---|---|---|
| AU | 40083/68 | 1/1970 |
| CH | 360 258 | 2/1962 |
| EP | 1 813 856 A1 | 1/2007 |
| GB | 686404 | 1/1953 |
| GB | 2 201 229 A | 8/1988 |
| JP | 2006-144841 | 6/2006 |
| WO | WO 2004/005779 A1 | 1/2004 |

* cited by examiner

*Primary Examiner* — Stephen M Hepperle
*Assistant Examiner* — Jonathan Waddy
(74) *Attorney, Agent, or Firm* — Oblon, Spivak, McClelland, Maier & Neustadt, L.L.P.

(57) ABSTRACT

In a valve device for selectively opening and closing a flow passage formed to open on a valve seat by a valve body through a resin-made seat, a hollow portion is formed on either one of the valve body and the valve seat and receives the resin-made seat therein, the resin-made seat has a thickness so that the resin-made seat partly protrudes from the hollow portion, and when the valve body is operated to close the flow passage, the resin-made seat is compressed to bring an end surface of the valve body into contact with the valve seat.

5 Claims, 3 Drawing Sheets

VALVE DEVICE AND MANUALLY OPERATED SHUTOFF VALVE DEVICE

INCORPORATION BY REFERENCE

This application is based on and claims priority under 35 U.S.C. 119 with respect to Japanese patent application No. 2007-247615 filed on Sep. 25, 2007, the entire content of which is incorporated herein by reference.

BACKGROUND OF THE INVENTION

1. Field of the Invention

The present invention relates to a valve device suitable for use with a gas tank or the like for storing high-pressure gas and also relates to a manually operated shutoff valve device using the valve device.

2. Discussion of the Related Art

Generally, a plug body for closing an opening portion of a gas tank is provided therein with a plurality of flow passages which make the interior and exterior of the gas tank communicate, and a plurality of valve devices such as, for example, manually operated shutoff valves for blocking the flow of high-pressure gas in the respective flow passages. As a valve device of this kind, there has been known one which is described in EP 1 813 856 A1 (equivalent of JP 2006-144841 A1).

The valve device (manual valve) described in the European patent application is provided with a housing (35) taking a bottomed, cylindrical shape, a valve body (36) held in the housing slidably in the axial direction thereof and an operating screw (37) for operating the valve body. At an bottom portion of the housing, there is formed a through hole (38) communicating with a through hole (32) of a check valve (9), and a valve seat (40) of a taper shape which the valve body (36) seats on and goes away from is formed at the circumferential edge of the through hole (38). On one hand, a taper surface is formed at an extreme end portion (36a) of the valve body (36) and seats on the valve seat (40) to close the through hole (38), so that the flow of hydrogen gas in a filling passage can be blocked.

By the way, in recent years, the pressurization in hydrogen gas tanks equipped on fuel cell vehicles or the like has been accelerated for increase in storage capacity, wherein higher reliability which meets the accelerated pressurization has been required. To this end, the aforementioned housing (35) and the valve body (36) have been made of a metal such as stainless steel.

However, since the prior art described in the European patent application is constructed to close the through hole by bringing the valve body into taper surface contact with the valve seat formed on the housing, there arises a problem that precise machining is required for high coaxial alignment between the valve body and the valve seat in securing precise airtightness.

In order to meet the requirement, it may be conceived to make the housing forming the valve seat with a soft metal material such as, for example, aluminum or the like. In this case, there is taken a construction that the housing and the valve body are respectively made of aluminum and stainless steel. Where the construction is taken to use different metal materials, however, there is a risk that abnormal deformation takes place at the sealing portion due to the line-contact or deformation which occurs when the valve is closed. This leads to another risk that burs made by the deformation separate and flow as foreign matter throughout the system, deteriorating the function of the valve device.

SUMMARY OF THE INVENTION

It is therefore a primary object of the present invention to provide a valve device and a manually operated shutoff valve device using the same wherein a valve body and a valve seat can be made with different metal materials and wherein it is not required to take misalignment therebetween into account.

Briefly, according to the present invention, there is provided a valve device for selectively opening and closing a flow passage, and the valve device comprises a valve seat with the flow passage opening thereon; a valve body movable for selectively opening and closing the flow passage at an end portion thereof; a hollow portion formed on either one of the valve body and the valve seat; a resin-made seat received in the hollow portion and configured to be brought into flat surface contact with the other of the valve body and the valve seat, the resin-made seat having a thickness so that the resin-made seat partly protrudes from the hollow portion; and a mechanism for operating the valve body to bring the end portion of the valve body into contact with the valve seat with the resin-made seat being compressed.

With this construction, since the valve device takes the construction that the hollow portion is formed on either one of the valve body and the valve seat and receives therein the resin-made seat which is configured to be brought into flat surface contact with the other of the valve body and the valve seat, that the resin-made seat has the thickness so that the resin-made seat partly protrudes from the hollow portion, and that the end portion of the valve body is brought by the mechanism into contact with the valve seat with the resin-made seat being compressed, precise coaxial alignment is no longer required between the valve body and the valve seat, and thus, precise machining is no longer required, so that freedom can be enhanced in choosing metal materials for the valve seat. In addition, since the end portion of the valve body is brought into contact with the valve seat when the valve is closed, the resin-made seat can be prevented from being compressed excessively, so that the sealing function of the resin-made seat can be kept stably for a long term of use.

In another aspect of the present invention, there is provided with a manually operated shutoff valve device using the valve device of the character set forth above, wherein the mechanism for operating the valve body is configured to be operated manually. Because the valve device of the character set forth above is incorporated therein, the manually operated shutoff valve device can achieve substantially the same functions and effects as those of the valve device of the character set forth above.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

Figure 1:
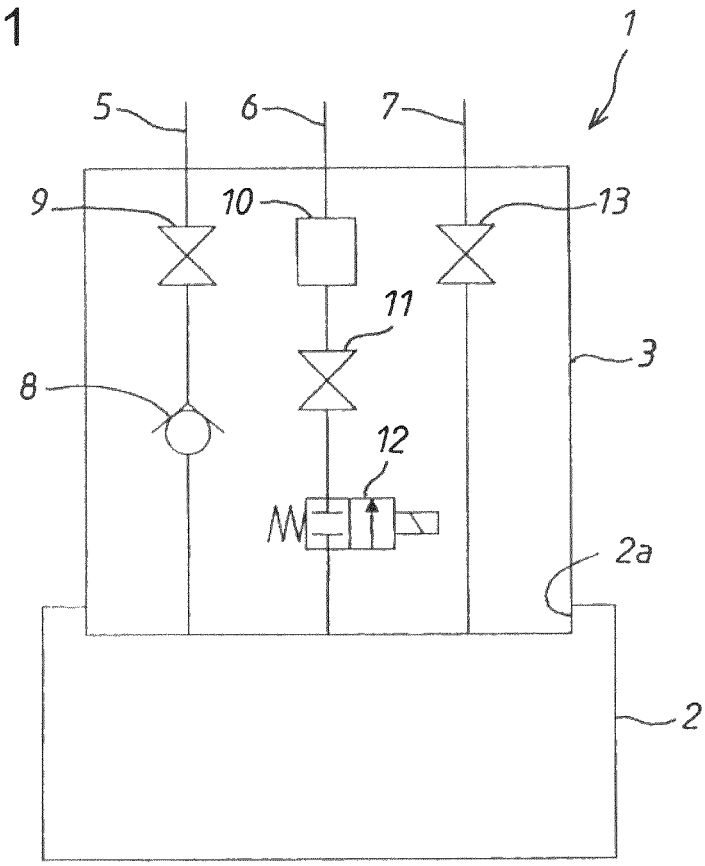
FIG. 1 is a circuit diagram of a gas tank used in a first embodiment according to the present invention.

Hereafter, a manually operated shutoff valve device in a first embodiment according to the present invention will be described with reference to FIGS. 1 to 4 in the form of being applied to a hydrogen gas tank. Referring now to FIG. 1, a gas tank 1 in the first embodiment is provided with a tank main body 2 for storing hydrogen gas therein and a plug body 3 for closing an opening portion 2a of the tank main body 2. The plug body 3 is provided with a plurality of flow passages for making the interior and exterior of the tank main body 2 communicate with each other and a plurality of valve devices for controlling the flow of hydrogen gas in each of the respective flow passages.

Specifically, the plug body 3 has formed therein a filling passage 5 for filling the tank main body 2 with hydrogen gas, a supply passage 6 for supplying the hydrogen gas in the tank main body 2 outside, and a discharge passage 7 for discharging the hydrogen gas in the tank main body 2 outside.

The filling passage 5 has arranged thereon a check valve device 8 for preventing the hydrogen gas stored in the tank main body 2 from flowing backward and a manually operated shutoff valve device 9 which can be operated by hand from outside to block the flow of hydrogen gas. The supply passage 6 has arranged thereon an electromagnetic shutoff valve device 12, a manually operated shutoff valve device 11 and a pressure reduction valve device 10. The discharge passage 7 has a manually operated shutoff valve device 13 arranged thereon.

Hereafter, a first embodiment of the manually operated shutoff valve device 9 arranged on the filling passage 5 will be described in detail with reference to FIGS. 2 to 4.

Figure 2:
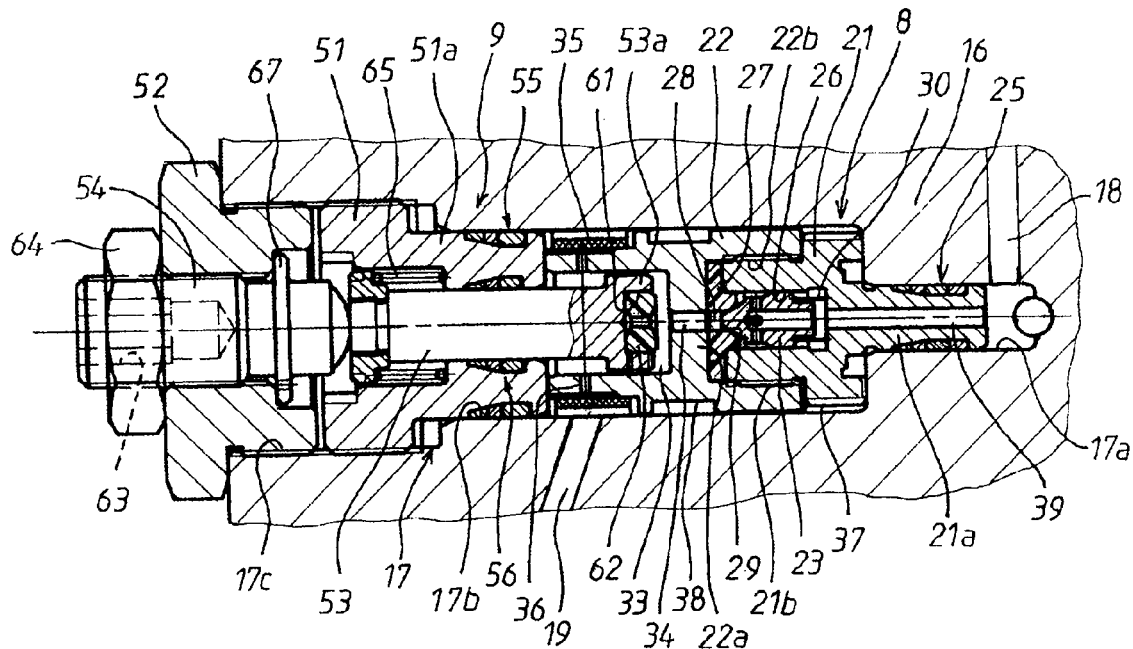
FIG. 2 is a longitudinal sectional view of a manually operated shutoff valve device in the first embodiment according to the present invention.

Referring now to FIG. 2, a plug body housing 16 constituting the plug body 3 has formed therein a receiving hole 17 with one end opening outside. The receiving hole 17 is connected to a first flow passage 18 and a second flow passage 19 which jointly constitute the filling passage 5. The receiving hole 17 is composed of a small-diameter hole 17a, an intermediate-diameter hole 17b and a large-diameter hole 17c which are formed in order from the bottom of the receiving hole 17. The check valve device 8 is arranged to extend from the small-diameter hole 17a to the intermediate-diameter hole 17b, while the manually operated shutoff valve device 9 is arranged to extend from the intermediate-diameter hole 17b to the large-diameter hole 17c. The first flow passage 18 communicating with the interior of the gas tank 1 (i.e., the tank main body 2) opens into the small-diameter hole 17a, and the second flow passage 19 communicating with the outside of the gas tank 1 opens into the intermediate-diameter hole 17b.

The check valve device 8 is mainly composed of a first housing 21 fitted in the intermediate-diameter hole 17b of the receiving hole 17, a second housing 22 bodily jointed with the left end of the first housing 21 by being screw-engaged on the left end, and a check valve body 23 received in the first housing 21. The first housing 21 has a small-diameter sleeve portion 21a fitted in the small-diameter hole 17a, and the clearance in radial directions between the small-diameter sleeve portion 21a and the small-diameter hole 17a is sealed with sealing means 25 composed of an O-ring and several backup rings. Although terms "left end" and "right end" are used throughout the description only for the purpose of easier understanding with reference to the drawings, they do not limit the present invention and should be interpreted merely as one end and the other end, respectively.

In the first housing 21, there is received a valve hole 26 receiving the check valve body 23, and the right end of the valve hole 26 is connected to the first flow passage 18 through a fluid passage 39 formed at a center portion of the small-diameter sleeve portion 21a. On the left end side of the valve hole 26, a resin-made seat 27 is arranged to be put between the first housing 21 and the second housing 22. The resin-made seat 27 is made of, e.g., polyamide resin, and a through hole 28 is formed at the center portion of the resin-made seat 27. A valve seat 29 is formed at one end on the valve hole 26 side of the through hole 28. The check valve body 23 having a tapered poppet valve which is able to seat on and go away from the valve seat 29 is slidably inserted in the valve hole 26 and is urged by means of a spring 30 in the direction toward the valve seat 29.

High-pressure hydrogen gas is applied through the first flow passage 18 and the fluid passage 39 to the check valve body 23 to move the same in the same direction as urged by the spring 30, so that the check valve body 23 ordinarily closes the valve seat 29. A radial passage and an axial passage are formed in the check valve body 23, and in the state that the check valve body 23 goes away from the valve seat 29, the through hole 28 with the valve seat 29 formed therearound is brought into communication with the first flow passage 18 through the redial passage and the axial passage both formed in the check valve body 23 and further through the fluid passage 39 formed in the small-diameter sleeve portion 21a.

The second housing 22 takes a generally cylindrical form and is provided with a partition wall 22a at its axial-mid portion. On the right end side of the partition wall 22a, the second housing 22 has formed a screw hole 22b, into which the first housing 21 is screwed at its male screw portion 21b formed at its left end. The left side of the second housing 22 has formed therein a cylindrical concave portion 33, which receives therein with a ply the right end portion 53d of a shutoff valve body 53 of the manually operated shutoff valve device 9 configured as described later in detail. A bottom surface of the concave portion 33, that is, the left end surface of the partition wall 22a is defined as a valve seat 40 with which a resin-made seat 62 described later and best shown in FIG. 3 is brought into flat surface contact. A shutoff flow passage 34 is formed at the center portion of the partition wall 22a to open on the valve seat 40 and communicates with the valve seat 29 on the check valve body 23 side. The second housing 22 with the valve seat 40 formed on the bottom surface of the concave portion 33 constitutes a valve seat member in the claimed invention.

A filter 35 opening to the second flow passage 19 is fitted on the circumferential surface of the second housing 22 around the concave portion 33. The filter 35 is in fluid communication with the concave portion 33 through radial holes 36 formed in the second housing 22. Thus, hydrogen gas can be supplied from the second flow passage 19 to the tank main body 2 through the filter 35, the radial holes 36, the concave portion 33, the shutoff flow passage 34, the check valve body 23 and the like.

A hexagonal head portion 37 is formed on the circumferential surface of the first housing 21, while a diametrically opposed two-flatted head portion 38 is formed on the circumferential surface of the second housing 22. By rotating the hexagonal head portion 37 of the first housing 21 with a suitable tool such as wrench in the state that the second housing 22 is fixed at the two-flatted head portion 38 against rotation, the male screw portion 21b of the first housing 21 can be screwed into the screw hole 22b of the second housing 22, so that the first and second housings 21, 22 can be jointed bodily. Thus, the check valve device 8 in the assembled state can be assembled and fitted in the receiving hole 17 of the plug body housing 16.

The aforementioned check valve device 8 is constructed so that the check valve body 23 is singly capable of preventing high-pressure hydrogen gas from leaking. To this end, the resin-made seat 27 having the valve seat 29 which the check valve body 23 seats on and goes away from is squeezed between the right end surface of the first housing 21 and the partition wall 22a of the second housing 22 when the first and the second housings 21, 22 are jointed, so that the surface pressure between the right end surface of the resin-made seat 27 and the left end surface of the first housing 21 can be increased.

As shown in FIG. 2, the manually operated shutoff valve device 9 is composed of a first plug 51 and a second plug 52 which are screw-engaged with a screw portion formed on the large-diameter hole 17c of the receiving hole 17, the shutoff valve body 53 slidably fitted in the first plug 51, an operating screw shaft 54 screw-engaged in the second plug 52 to be adjustable in position for operating the shutoff valve body 53 to move back and forth, and the like.

The first plug 51 is provided with a fit portion 51a fitted in the intermediate-diameter hole 17b. The right end of the fit portion 51a is in contact with the left end portion of the aforementioned second housing 22. By screwing the first plug 51, the first housing 21 jointed with the second housing 22 is brought into contact with a bottom surface of the intermediate-diameter hole 17b of the receiving hole 17 to be secured thereon. The clearance between the external surface of the fit portion 51a of the first plug 51 and the intermediate-diameter hole 17b is sealed by sealing means 55 composed of an O-ring and several backup rings. Further, the first plug 51 slidably fits the shutoff valve body 53 therein on the axis at the fit portion 51a, and the clearance between the internal surface of the fit portion 51a and the external surface of the shutoff valve body 53 is sealed by sealing means 56 composed of an O-ring and several backup rings.

The shutoff valve body 53 is made of a metal such as stainless steel. The right end portion 53d of the shutoff valve body 53 is inserted into the concave portion 33 of the second housing 22 with a play in radial directions. The play defines a clearance around the right end portion 53d of the shutoff valve body 53 relative to the internal surface of the concave portion 33, and the clearance constitutes a part of a gas pathway from the radial holes 36 to the shutoff flow passage 34. Further, the right end surface of the shutoff valve body 53 has a hollow portion 61 at the center portion thereof, so that an annular protrusion 53a is formed around the hollow portion 61, as best shown in FIG. 3. The ring-shape resin-made seat 62 is press-fitted in the hollow portion 61 of the shutoff valve body 53 for selectively opening and closing the shutoff flow passage 34 through selective contact with the valve seat 40 formed on the partition wall 22a of the second housing 22. The resin-made seat 62 is made of, e.g., polyimide resin and is able to close the shutoff flow passage 34 when brought into flat surface contact with the valve seat 40 (i.e., the partition wall 22a). The thickness of the resin-made seat 62 is set to be larger than the depth of the hollow portion 61 in the free or uncompressed state, and thus, the resin-made seat 62 partly protrudes from the end surface of the annular protrusion 53a in the state that it opens the shutoff flow passage 34. At the right end portion 53d of the shutoff valve body 53, as shown in FIG. 3, there is provided a radial hole 53c which makes a bottom area in the hollow portion 61 communicate with the external surface of the shutoff valve body 53. When the ring-shape resin-made seat 62 is press-fitted in the hollow portion 61, the air or gas in the bottom area in the hollow portion 61 can be exhausted to the external surface of the shutoff valve body 53 through the radial hole 53c. Therefore, it can be realized to fit the ring-shape resin-made seat 62 in the hollow portion 61 of the shutoff valve body 53 easily and reliably.

In the manually operated shutoff valve device 9 wherein the shutoff valve body 53 is brought into a closed position with the pressure being applied thereto, there is a possibility that at the time of valve opening, the resin-made seat 62 remains in contact with the valve seat 40 to move relative to the shutoff valve body 53 in such a direction as to come off from the concave portion 61. In order to prevent this drawback, the shutoff valve body 53 is provided with a radial cutout 53b at one place in the circumferential direction on the right end surface of the annular protrusion 53a, as shown in FIG. 3. Thus, where at the time of valve opening, the resin-made seat 62 is apt to remain in contact with the valve seat 40 of the partition wall 33 and is apt to move relative to the shutoff valve body 53 in the direction to come off from the concave portion 61, the radial cutout 53b opens the contact surface of the resin-made seat 62 with the valve seat 40 to the second flow passage 19 side to help the resin-made seat 62 separate from the valve seat 40. Further, in this particular embodiment, the relative movement between the ring-shape resin-made seat 62 and the shutoff valve body 53 can suppressed much more reliably by making the resin-made seat 62 take a ring shape having a gas vent 62a at the center portion thereof and by providing the radial hole 53c. The provision of the gas vent 62a helps the ring-shape resin-made seat 62 to easily separate from the valve seat 40 by preventing a negative pressure from being generated therebetween.

The second plug 52 is screwed into the female screw portion on the large-diameter hole 17c at a position which is outside the first plug 51 in the axial direction. The operating screw shaft 54 with a hexagonal hole 63 is screw-engaged with the second plug 52 to be adjustable in its axial position and can be locked by means of a lock nut 64 at a desired position.

A spring 65 is interposed between the first plug 51 and the shutoff valve body 53, and ordinarily, the shutoff valve body 53 is kept by the resilient force of the spring 65 in a retracted position to contact the operating screw shaft 54 and opens the shutoff flow passage 34. By turning the operating screw shaft 54 by the use of the hexagonal hole 63 to advance the operating screw shaft 54, it becomes possible to move the shutoff valve body 53 against the resilient force of the spring 65. As a consequence, the resin-made seat 62 provided at the right end portion 53d of the shutoff valve body 53 is brought into flat surface contact with the partition wall 22a of the second housing 22 to be squeezed and closes the shutoff flow passage 34. At this time, the resin-made seat 62 is compressed a predetermined amount whereby a portion of the sloped recess surrounding the gas vent 62a in the resin-made seat 62 is also brought into flat surface contact with the partition wall 22a, as shown in FIG. 4. Moreover, at this time the annular protrusion 53a of the shutoff valve body 53 is brought into contact with the left end surface of the partition wall 22a, so that the resin-made seat 62 is prevented from being squeezed excessively. The operating screw shaft 54 is provided thereon with a restriction plate 67 for defining a retracted position of the operating screw shaft 54. With this construction, the operating screw shaft 54 can be prevented from being unscrewed and coming out of the second plug 52 in the event that the lock nut 64 is loosened.

In the manually operated shutoff valve device 9 in the foregoing first embodiment, the shutoff valve body 53 is moved toward the check valve body 23 against the resilient force of the spring 65 by turning the operating screw shaft 54. Thus, the resin-made seat 62 fitted in the right end portion 53d of the shutoff valve body 53 is brought into flat surface contact with the valve seat 40 and is pressed on the valve seat 40 (i.e., the partition wall 22a) of the second housing 22 to be compressed, as shown in FIG. 4. As a consequence, the shutoff flow passage 34 opening on the valve seat 40 is closed, whereby the hydrogen gas in the filling passage 5 is blocked from flowing.

Since the resin-made seat 62 is compressed a predetermined amount at this time, the annular protrusion 53a of the shutoff valve body 53 is brought into contact with the valve seat 40, so that the resin-made seat 62 can be prevented from being squeezed excessively. In addition, since the valve seat 40 is sealed by bringing the resin-made seat 62 into flat surface contact with the valve seat 40, unlike the prior art wherein a taper surface is utilized for sealing, precise machining becomes unnecessary, and freedom is increased in choosing metal materials used for the valve seat. It should be noted that the right end portion 53d of the shutoff valve body 53 is formed as a large-diameter portion. This large-diameter portion 53d serves as a restriction portion engageable with the right end surface of the first plug 51, so that the shutoff valve body 53 can be prevented from coming out of the first plug 51 in the event that either the operating screw shaft 54 is unscrewed from the second plug 52 or the second plug 52 is unscrewed from the plug body housing 16.

The shutoff valve body 53 can be moved by the resilient force of the spring 65 in the direction to go away from the check valve body 23 by turning the operating screw shaft 54 in a direction opposite to that as aforementioned. The resin-made seat 62 fitted in the right end portion 53d of the shutoff valve body 53 goes away from the valve seat 40 of the second housing 22, whereby the shutoff flow passage 34 is opened.

In this state, hydrogen gas is admitted from the second flow passage 19 and is flown through the filter 35 into the concave portion 33. The hydrogen gas acts on the check valve body 23 through the shutoff flow passage 34 and pushes the check valve body 23 against the resilient force of the spring 30. As a result, the valve seat 29 is opened, whereby the hydrogen gas is flown into the first flow passage 18 to be filled in the tank main body 2.

(Second Embodiment)

Next, a second embodiment according to the present invention will be described with reference to FIG. 5. The difference of the second embodiment from the foregoing first embodiment resides in that the present invention is applied to a pressure relief valve device 70 which performs a pressure relief operation by opening a shutoff flow passage 134 opening on a valve seat 140. Therefore, the difference from the first embodiment will be mainly described hereafter, and the description of the same structural components will be omitted since they are given the same reference numerals.

In the second embodiment, a receiving hole 117 is formed in the plug body housing 16, and the shutoff flow passage 134 which is selectively opened and closed by a valve body 153 opens on a valve seat 140 formed on a bottom surface of the receiving hole 117. The valve body 153 is slidably fitted in the first plug 51 fixedly screwed in the receiving hole 117, and a hollow portion 161 is formed at the right end surface of the valve body 153 in the same manner as the foregoing first embodiment. A press-fit hole 71 which is smaller in diameter than the hollow portion 161 is formed at a bottom surface of the hollow portion 161. A resin-made seat 162 taking a T-shape when taken along the axis is received in the hollow portion 161 with a play provided in radial directions between a large-diameter portion of the resin-made seat 162 and the internal surface of the hollow portion 161 and is press-fitted in the press-fit hole 71 at a small-diameter portion thereof.

The resin-made seat 162 is made of, e.g., polyimide resin and is brought into flat surface contact with the valve seat 140 to close the shutoff flow passage 134. The thickness at the large-diameter portion of the resin-made seat 162 is set to be larger than the depth of the hollow portion 161 in the free or uncompressed state, and the resin-made seat 162 partly protrudes from the right end surface of an annular protrusion 153a in the state that it opens the shutoff flow passage 134. By manually turning the operating screw shaft 54 which is screwed in the second plug 52 to be adjustable in its axial position, the valve body 153 is moved as it compresses the resin-made seat 162 until the annular protrusion 153a comes into contact with the valve seat 140 (i.e., the bottom surface of the receiving hole 117).

The pressure relief valve device 70 in the second embodiment is not one that performs a valve opening operation with a substantial pressure acting on the valve body 153. However, for a different purpose, a cutout 153b is formed at one place in the circumferential direction on the right end surface of the annular protrusion 153a of the valve body 153.

That is, there may arise a situation for example that foreign matter is put between the resin-made seat 162 and the valve seat 140, whereby the shutoff flow passage 134 is not closed completely by the resin-made seat 162. Even in this situation, however, the abutting contact of the annular protrusion 153a with the valve seat 140 may make such a state as if the shutoff flow passage 134 were completely closed by the resin-made seat 162. In order to overcome this deficiency, the cutout 153b is formed at one place in the circumferential direction on the end surface of the annular protrusion 153a, and the cutout 153 works to prevent the shutoff flow passage 134 from being closed completely even in the event that the annular protrusion 153a is brought into contact with the valve seat 140 with foreign matter being put between the resin-made seat 162 and the valve seat 140 and that the resin-made seat 162 does not completely close the shutoff flow passage 134. In this way, the aforementioned deficiency can be detected at an inspection process before product shipment, so that the reliability of the products can be enhanced.

In the foregoing second embodiment, the valve body 153 is moved against the resilient force of the spring 65 by turning the operating screw shaft 54. Thus, the resin-made seat 162 fitted in the right end portion 153d of the valve body 153 is brought into flat surface contact with the valve seat 140 and is pressed on the valve seat 140 to be compressed. As a consequence, the shutoff flow passage 134 opening on the valve seat 140 is closed, whereby the communication between the shutoff flow passage 134 and a pressure relief hole 73 is blocked. Here, it should be noted that when compressed in the moving direction of the valve body 153, the resin-made seat 162 runs in radial directions to occupy the clearance made relative to the internal surface of the hollow portion 161.

Since the resin-made seat 162 is compressed a predetermined amount at this time, the annular protrusion 153a of the shutoff valve body 153 is brought into contact with the valve seat 140, and thus, the resin-made seat 162 can be prevented from being squeezed excessively. In addition, since the valve seat 140 is sealed by bringing the resin-made seat 162 into flat surface contact with the valve seat 140, unlike the prior art wherein a taper surface is utilized for sealing, precise machining becomes unnecessary, and freedom is increased in choosing metal materials used for the valve seat 140. Accordingly, the plug body housing 16 with the valve seat 140 formed thereon can be made of aluminum for light weight. In addition, even where the valve body 153 and the plug body housing 16 are constituted with different metal materials of stainless steel and aluminum, burs as occurring in the prior art are not formed by the deformation of the seal portion, and thus, it does not occur that the valve device is harmed in function.

Further, by forming the cutout 153b on the end surface of the annular protrusion 153a of the valve body 153, foreign matter put between the resin-made seat 162 and the valve seat 140 can be detected easily at an inspection process with the annular protrusion 153a being in contact with the valve seat 140, so that it can be realized to enhance the reliability of the products.

(Third Embodiment)

Figure 6:
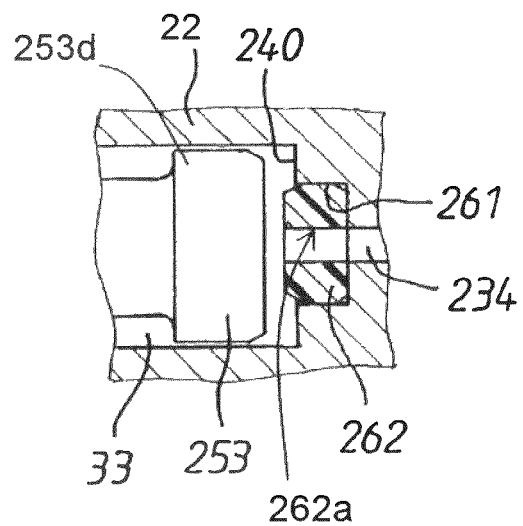
FIG. 6 is an enlarged fragmentary sectional view of a manually operated shutoff valve device in a third embodiment according to the present invention.

FIG. 6 shows a part of a third embodiment according to the present invention. The difference from the foregoing second embodiment resides in that a resin-made seat 262 is fitted in a valve seat 240 with which the right end portion 253d of a valve body 253 is brought into contact.

In the third embodiment, a hollow portion 261 is formed on the valve seat 240 with which the right end surface of the valve body 253 is brought into contact, and a shutoff flow passage 234 opens to the hollow portion 261. A ring-shape resin-made seat 262 is press-fitted in the hollow portion 261, and the thickness of the resin-made seat 262 is set to be larger than the depth of the hollow portion 261 in the free or uncompressed state. The valve body 253 for flat surface contact with the resin-made seat 262 is moved as it compresses the resin-made seat 262 until it comes into contact with the valve seat 240, and closes the shutoff flow passage 234 to block the flow of gas. The same effects as those in the foregoing embodiments can be achieved also in the third embodiment.

In the foregoing embodiments, description has been made taking examples wherein the valve device for selectively opening and closing the shutoff flow passage 34 (134, 234) is applied to the manually operated shutoff valve device 9 and the pressure relief valve device 70. However, the present invention is not limited to such valve devices and is applicable to various valve devices of the construction that the shutoff flow passage 34 (134, 234) opening on the valve seat 40 (140, 240) is selectively closed and opened by the valve body 53 (153, 253) through the resin-made seat 62 (162, 262).

Further, although in the foregoing embodiments, description has been made taking examples that the valve body 53 (153, 253) is made of stainless steel while the plug body housing 16 with which the valve body is brought into contact is made of aluminum for light weight, both of the valve body and the plug body housing can be made of stainless steel because the accuracy in alignment is no longer required. Even in this case, there can be attained advantages that portions which should be machined precisely can be decreased in number and that the freedom can be enhanced in choosing the metal materials used for the valve seat.

Various features and many of the attendant advantages in the foregoing embodiments will be summarized as follows:

In the valve device in any of the foregoing first to third embodiments typically shown in FIGS. 2, 3, 5 and 6, the valve device takes the construction that the hollow portion 61, 161, 261 is formed on either one of the valve body 53, 153, 253 and the valve seat 40, 140, 240 to receive therein the resin-made seat 62, 162, 262 which is configured to be brought into flat surface contact with the other of the valve body and the valve seat, that the resin-made seat has such a thickness as to partly protrude from the hollow portion, and that the end portion of the valve body is brought by the mechanism 52, 54 into contact with the valve seat with the resin-made seat being compressed. Therefore, precise coaxial alignment is no longer required between the valve body and the valve seat and precise machining is no longer required, so that freedom can be enhanced in choosing metal materials used for the valve seat. In addition, since the end portion of the valve body is brought into contact with the valve seat when the valve is closed, the resin-made seat can be prevented from being compressed excessively, so that the sealing function of the resin-made seat can be kept stably for a long term of use.

Figure 3:
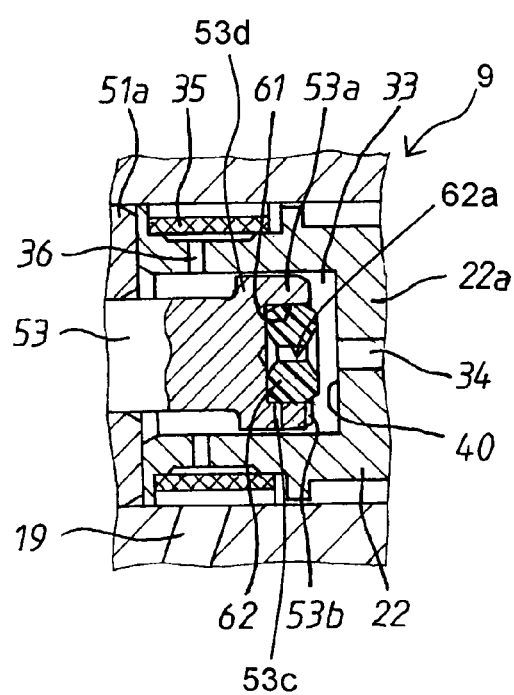
FIG. 3 is an enlarged fragmentary sectional view showing a part of the manually operated shutoff valve device.
Figure 4:
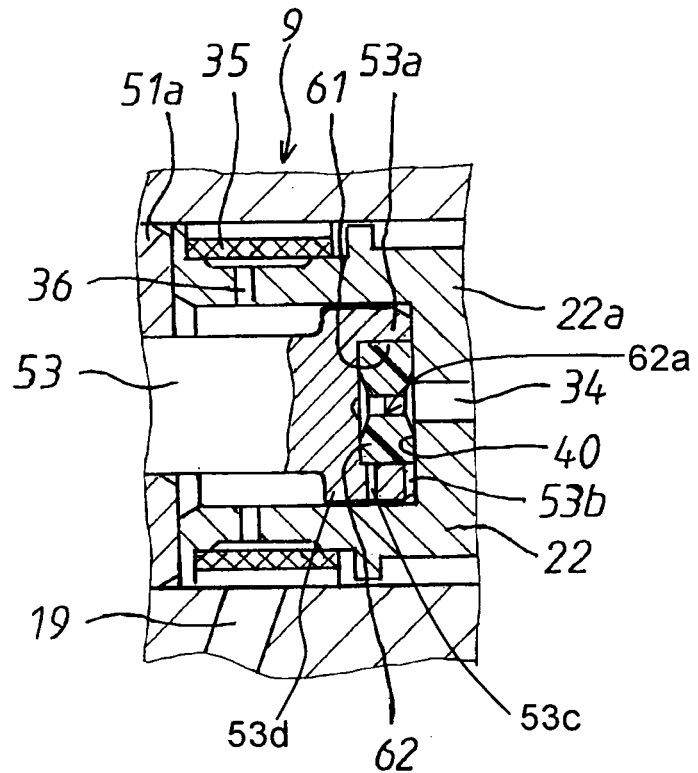
FIG. 4 is an enlarged fragmentary sectional view showing an operated state of the part shown in FIG. 3.

In the valve device in the foregoing first embodiment typically shown in FIGS. 2 and 3, the valve seat member 22 having the generally cylindrical concave portion 33 which forms the valve seat 40 at a bottom surface thereof is made of a metal, and the valve body 53 is made of a metal which is the same or different in kind from that of the valve seat member and receives the resin-made seat 62 in the hollow portion 61 formed in the end portion of the valve body 53. Thus, when the valve device is closed, the resin-made seat is pressed on the valve seat and is compressed to bring the end surface of the valve body into contact with the valve seat. Accordingly, precise coaxial alignment is no longer required between the valve body and the valve seat, and the resin-made seat can be prevented from being squeezed excessively.

In the valve device in the foregoing first embodiment typically shown in FIGS. 2 and 3, the resin-made seat 62 takes a ring shape having the gas vent 62a at the center part thereof. Thus, when the valve body 53 leaves the valve seat 40 to open the shutoff flow passage 34, the generation of a negative pressure between the resin-made seat and the valve seat is prevented, so that the ring-shape resin-made seat can easily be separated from the valve seat to move together with valve body.

Figure 5:
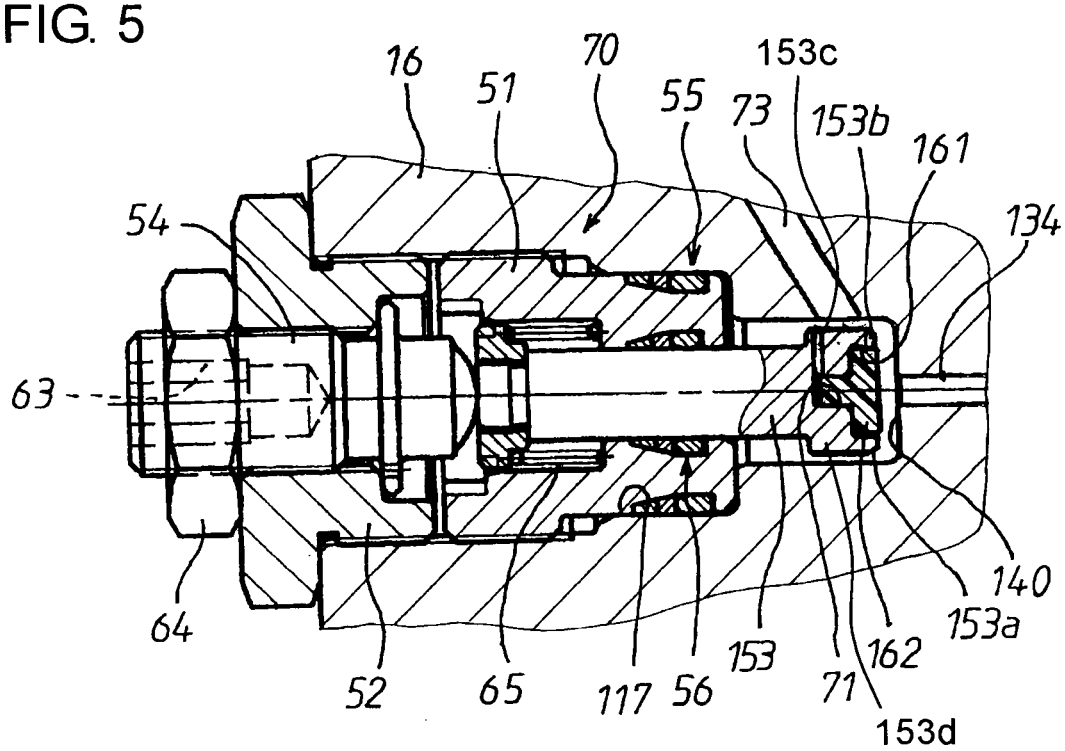
FIG. 5 is a fragmentary sectional view of a manually operated pressure relief valve device in a second embodiment according to the present invention.

In the valve device in the foregoing first and second embodiments typically shown in FIGS. 3 and 5, since the valve body 53, 153 is provided at the end portion thereof with the radial hole 53c, 153c which makes a bottom area in the hollow portion 61, 161 communicate with the external surface of the valve body, the fitting of the ring-shape resin-made seat 62, 162 in the hollow portion of the valve body can be done easily and reliably.

The valve device in any of the foregoing first to third embodiments typically shown in FIGS. 2, 3, 5 and 6 is used as the manually operated shutoff valve device 9. In the manually operated shutoff valve device 9, since freedom can be enhanced in choosing metal materials used for the valve seat 40, 140, 240, it becomes possible to employ aluminum as the material for the valve body housing 16 of the manually operated shutoff valve device 9, so that the same can be lightened.

The manually operated shutoff valve device 9 in any of the foregoing first to third embodiments typically shown in FIG. 2 is provided with the valve body housing 16; the first plug 51 fixedly screwed into the receiving hole 17 of the valve body housing 16; the valve body 53, 153, 253 received in the receiving hole to be slidable axially for selectively opening and closing the flow passage 34, 134, 234; the spring member 65 for urging the valve body in the direction to open the flow passage; the second plug 52 fixedly screwed into the receiving hole of the valve body housing; and the operating screw shaft 54 screwed into the second plug to be adjustable in the axial position thereof for moving the valve body against the resilient force of the spring member. With this configuration, by manually operating the operating screw shaft, the valve body can be brought into contact with the valve seat with the resin-made seat being compressed. This structure realizes the manually operated shutoff valve device which makes precise coaxial alignment unnecessary between the valve body and the valve seat and which can prevent the resin-made seat from being squeezed excessively.

In any of the foregoing first to third embodiments, the manually operated shutoff valve device 9 typically shown in FIG. 2, since the operating screw shaft 54 is provided thereon with the restriction plate 67 serving as a restriction member, so that the operating screw shaft can be prevented from being unscrewed from the second plug 52.

Obviously, numerous further modifications and variations of the present invention are possible in light of the above teachings. It is therefore to be understood that within the scope of the appended claims, the present invention may be practiced otherwise than as specifically described herein.

What is claimed is:

1. A valve device for selectively opening and closing a flow passage, the valve device comprising:
    a valve seat with a flat surface portion having an opening of the flow passage thereon;
    a valve body for selectively opening and closing the flow passage, wherein an end portion of the valve body is provided with a hollow portion recessed into the valve body relative to the end portion to define a flat bottom area recessed in the valve body, and a radial hole which makes the bottom area communicate with the external surface of the valve body;
    a ring shaped resin-made seat press-fit in the hollow portion and comprising a first side having a flat surface facing the valve seat, a second side having a flat surface facing the flat bottom area, a center hole connecting the first and second sides, an annular recess at said first side and surrounding said center hole, and an annular recess at said second side and surrounding said center hole, wherein the annular recesses slope continuously from the respective flat surfaces to the center hole, said resin-made seat having a thickness so that the resin-made seat partly protrudes from the hollow portion and extends outward from the end portion of the valve body, whereby the flat surface of the first side of the resin made seat may be brought into flat surface contact with the flat surface portion of the valve seat by relative movement of the valve body and the valve seat;
    a manually operated mechanism for operating one of the valve body and the valve seat to bring the flat surface of the first side of the resin-made seat into flat surface contact with the flat surface portion of the valve seat whereby the resin-made seat is compressed, and for further operating one of the valve body and the valve seat to compress the resin-made seat, wherein the end portion of the valve body is arranged to contact the flat surface portion of the valve seat such that the resin-made seat is not excessively compressed;
    a valve body housing;
    a first plug fixedly screwed into a receiving hole of the valve body housing and receiving therein the valve body to be axially slidable for selectively opening and closing the flow passage;
    an urging member for urging the valve body in a direction to open the flow passage;
    a second plug fixedly screwed into the receiving hole of the valve body housing; and
    an operating screw shaft screwed into the second plug to be manually adjustable in the axial position thereof, and contacting the valve body with point contact for moving the valve body against the resilient force of the urging member, wherein the mechanism for operating the valve body is composed of the second plug and the operating screw shaft.

2. The valve device as set forth in claim 1, wherein the valve seat and the valve body are made of a metal.

3. The valve device according to claim 1, wherein the operating screw shaft is provided thereon with a restriction member for preventing the operating screw shaft from being unscrewed from the second plug.

4. The valve device according to claim 1, further comprising:
    a lock nut engaged with the operating screw shaft and the second plug for locking the operating screw shaft on the second plug, and
    wherein the operating screw shaft is provided thereon with a restriction member for preventing the operating screw shaft from being unscrewed from the second plug so that the operating screw shaft is prevented from coming out of the second plug in the event that the lock nut is loosened.

5. The valve device according to claim 1, connected to a gas tank storing high pressure gas for selectively opening and closing a flow passage of said tank.

\* \* \* \* \*